INVENTOR.
CECIL A. CRAFTS
BY
Browne, Schuyler and Beveridge
ATTORNEYS

INVENTOR.
CECIL A. CRAFTS
BY
Browne, Schuyler and Beveridge
ATTORNEYS

INVENTOR.
CECIL A. CRAFTS
BY
Browne, Schuyler and Beveridge
ATTORNEYS

United States Patent Office
3,349,329
Patented Oct. 24, 1967

3,349,329

MEANS AND METHOD OF REDUCING JITTER DISTORTION OF BINARY DATA RECOVERED FROM A COMMUNICATION WAVE

Cecil A. Crafts, Santa Ana, Calif., assignor to Robertshaw Controls Company, Richmond, Va., a corporation of Delaware Filed July 30, 1963, Ser. No. 298,646
15 Claims. (Cl. 325—320)

This invention relates generally to the reduction of jitter in a keyed phase binary communication system associated with nonsynchronous timing of a keyed signal with respect to the carrier frequency. The invention is more particularly applicable to keyed phase systems which employ a multiply and divide principle of recovering phase and reference information at the receiver to resolve more completely the phase pulse timing information in a nonsynchronous system.

A receiver for use in such a system is illustrated in Patent No. 3,078,344, issued to C. A. Crafts et al. The transmitter produces a fixed frequency wave and modulates this wave, generally according to a keyed D.C. signal persisting for a number of cycles, and usually involves instantaneous changes of phase of a generated sine wave characteristic of keyed signals. It is ordinarily not convenient or economical to preset the precise number of cycles during which an altered keyed phase will remain changed from an arbitrarily established zero phase. Furthermore, it is customary and economically expedient to multiplex many subcarrier frequencies within a permissible frequency band within which each separate frequency is transmitted over the same line or radio link, modulated by the same machine or other keying means according to pulse lengths common to all frequencies. Thus the duration of a keyed signal bears no direct relationship to the wave length of the subcarrier, hereinafter referred to as the carrier. In a nonsynchronous transmitter the time of initiation, as well as the time of termination, of each keyed signal is not limited to any phase condition of the carrier wave when keying signal is initiated to begin a bit for transmission.

It is to be expected that a keyed signal persisting for 6 cycles or periods T of a particular frequency (a 6T pulse) would result in 6 cycles of altered phase of transmission. The same keyed signal would have a five cycle duration when applied to a wave at ⅚ that frequency (a 5T pulse), and would likewise result in 5 cycles of altered phase transmission. This same pulse applied to another frequency may give a 6½T or 5½T phase shifted pulse. When the bit duration is of greater than 5 cycles and less than 6, it will be clear that sometimes 6 cycles will show altered phase and sometimes only 5 cycles.

Upon consideration of a system in which information is derived at the receiver by a process including squaring and limiting, with differentiation of the limited result, a system dependent entirely upon axis crossing time is perceived wherein either 5 or 6 spikes result from the assumed 5½T pulse. Squaring, limiting and differentiating a periodic wave results in alternate positive and negative voltage spikes which correspond to positive-going axis crossings and negative-going axis crossings, respectively, which are referred to herein as positive and negative axis crossings. Further consideration shows that when a regular frequency is received and the axis crossing times are regular in time spacing, a delayed phase may be ordered at such a time that the last-received axis crossing can be repeated to produce an extra pair of axis crossings, and that filtering may not remove this effect entirely. It is apparent that an uncertainty occurs at the beginning and at the end of a bit transmission when a phase is shifted rapidly from one D.C. signal condition to another and a variation occurs in the resulting length or position of the transmitted bit. This is generally referred to as "jitter." It has the result that the pulse length as developed in the receiver to constitute the receiver output will vary with the carrier frequency and the time of keying even though the keying signals at the transmitter are alike. The maximum amount of this uncertainty is a fraction of one cycle, but this assumes some importance when a bit of information includes only a few cycles as at lower transmission frequencies. When received information is obtained from the axis crossings in previous systems only one axis crossing is available in each direction per cycle corresponding, for example, to the positive-going spikes of differentiated output derived from a square wave. Jitter in resulting length or timing of bits recovered may extend 10 or 20 percent depending principally upon bit length and frequency, or number of cycles per bit.

It is accordingly an object of this invention to provide method and means to reduce the jitter in keyed phase modulation of a carrier wave.

Another object of the invention is to provide for the utilization of both positive and negative axis crossing in a phase modulated carrier wave to produce increased phase modulation information in a receiver.

A further object of the invention is to provide a receiver for a phase communication system operating on the multiply and divide principle for recovering a reference wave at the receiver and correlating axis crossing information with the reference wave to double the frequency of phase information indicia utilizable in the receiver.

A still further object is to provide a process for adding trains of positive and negative axis crossing signals to double the rate of input, and to resolve together the results of both trains of signals.

These and other objects of invention will be better understood by reference to the accompanying drawings in which.

Figure 3:
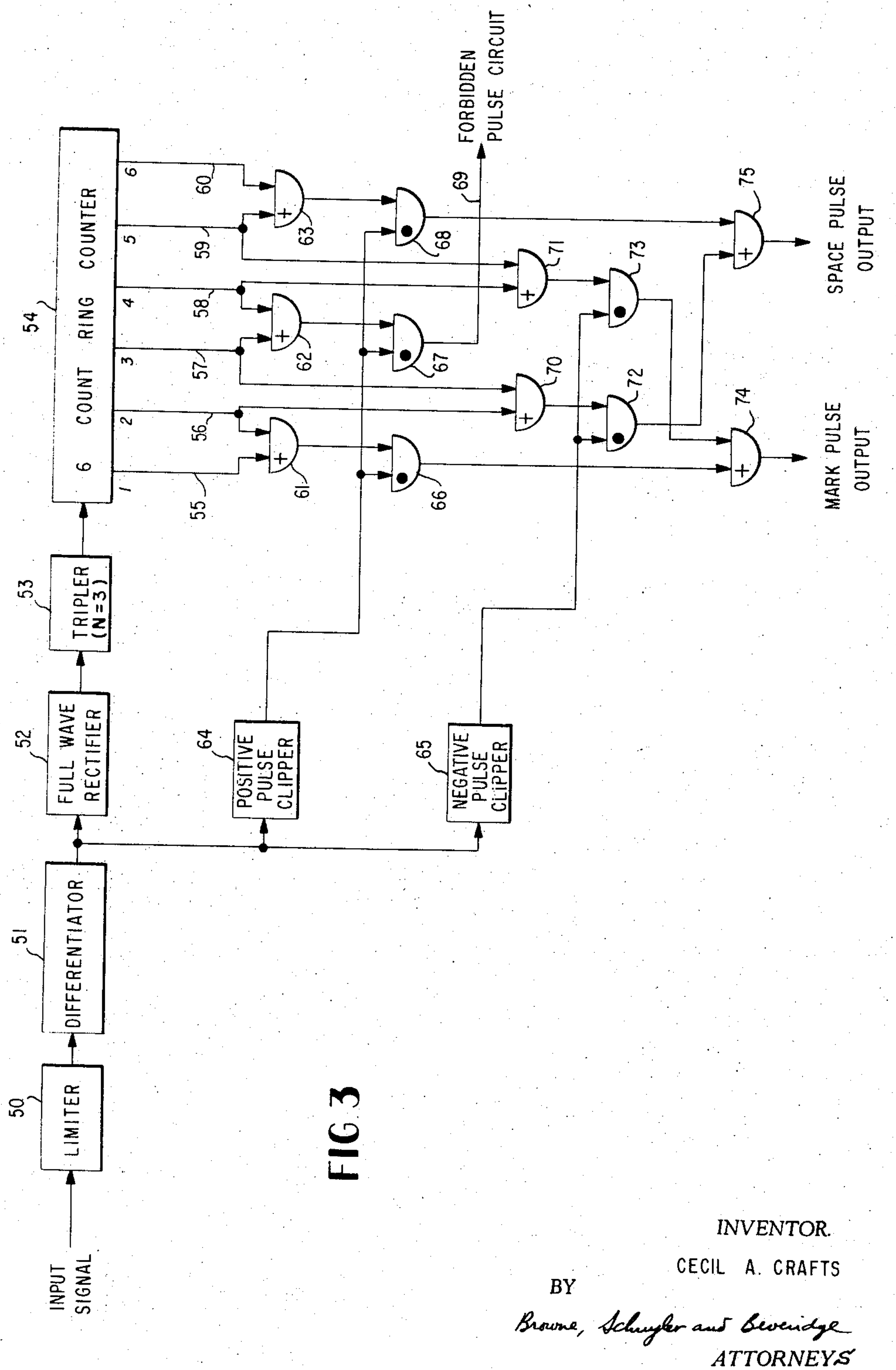
FIG. 3 illustrates in block diagram a receiver according to the present invention for which the wave forms of FIG. 2 show illustrative phase information recovery.

The objects and features of this invention are achieved principally by the addition to previously known receivers for binary keyed information employing multiply and divide circuitry to produce the reference wave. Such augmentation is effected by additional logic circuitry to utilize the differentiated negative spikes derived from the axis crossings of such a phase-modulated carrier and the employment of these negative spikes in a logic circuit, along with the positive spikes as disclosed in the above referenced patent, thus to secure a doubling of the information utilized in the system. When it is assumed that the carrier wave will be modulated in phase by employing two of three equally spaced phase intervals of a cycle, herein referred to as two used phase allocations of three phase allocations, the third being unused or "forbidden" such as the 0° position and the −120° position, the present invention contemplates the reception of the wave as in the previously mentioned patent, followed by a tripling of the frequency to provide an unmodulated wave which is thereafter divided by three, as in a ring gate, for comparison with the instantly received wave. The present invention substitutes for dividing circuitry (a three count ring counter) a six count ring counter, or its equivalent, the six outputs of which are combined in three OR gates to produce three inputs for AND gates according to the disclosure in the referenced patent, and as generally illustrated in FIG. 3 hereof. A system of this type may allocate three equally spaced phases per cycle of which one is forbidden as a phase selected for transmission. The receiver makes use of a ring counter stepped once for each allocated phase position per cycle has one output corresponding to this forbidden phase for the purpose of stepping the ring one step each time this output occurs, thereby to provide a resynchronization immediately upon the receipt of the next cycle of carrier wave after the reference wave has somehow gotten into the wrong phase. According to the improvement of this invention, two of the six ring outputs which correspond to this forbidden phase are not employed. The remaining four outputs of the ring counter are fed to additional OR gates and the outputs of these OR gates are led respectively to further AND gates fed also by the negative pulse corresponding to the negative axis crossings of the carrier wave when the reference is in proper phase relationship to the transmitter as determined by the absence of forbidden phase output.

The result of the logic circuitry thus briefly described is a doubling of the information presented to the output circuit of the receiver. While a six count ring counter is illustrated to receive the output of a tripler, it will be understood that a frequency multiplier which has an output five times the frequency of the received wave would have a ten count ring counter and corresponding logic circuitry.

Figure 1:
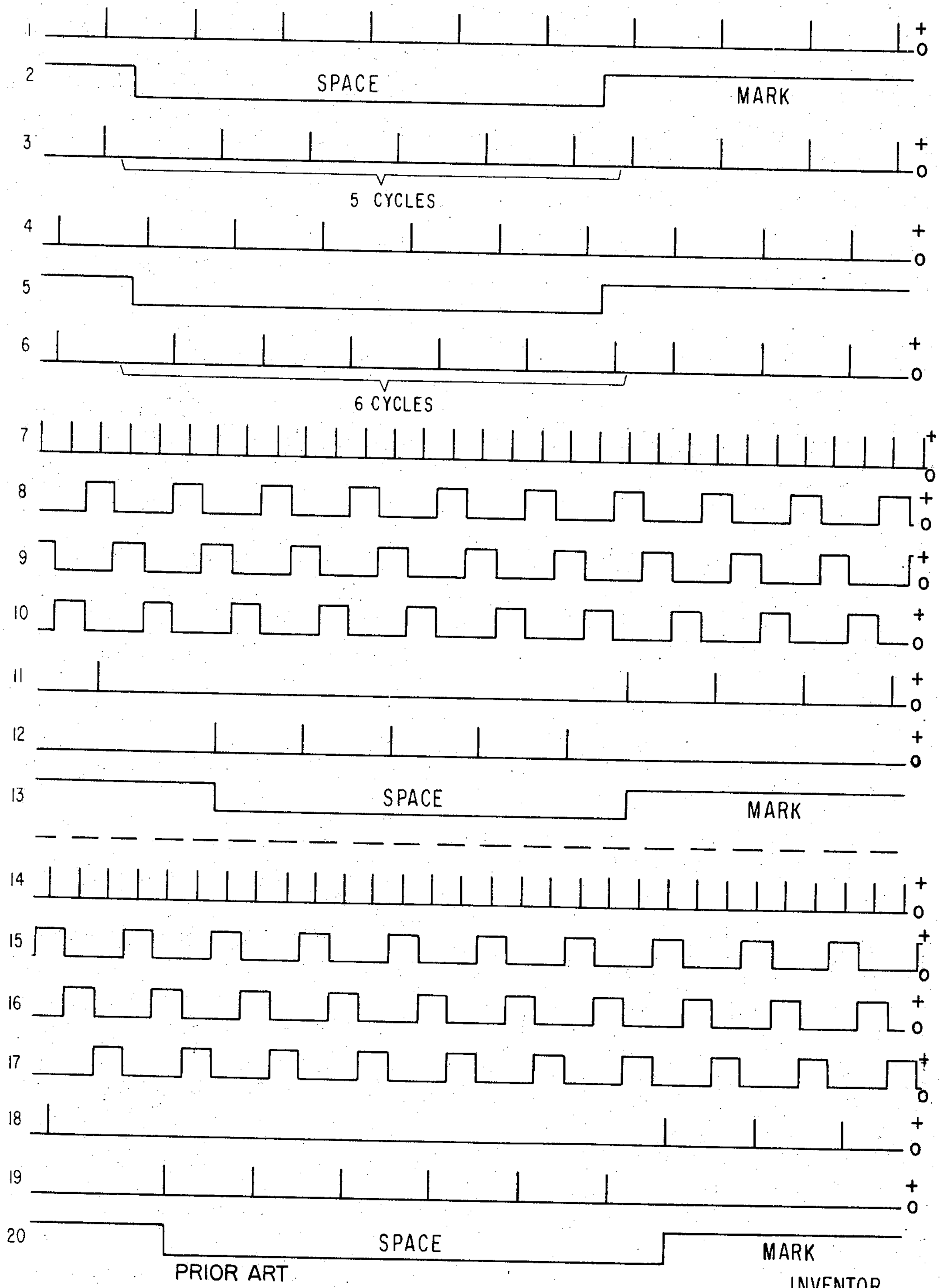
FIG. 1 illustrates typical wave forms, somewhat idealized, showing the origin and the amount of phase jitter present in previously known systems.

Proceeding first to a detailed explanation of the receiver which incorporates this improvement, reference is made to FIG. 1 in which there is illustrated at line 1 a series of pulses corresponding to idealized output of a differentiator operating on a very short time constant each time the input signal experiences a positive-going axis crossing, no modulation being there shown. In FIG. 3, the input signal is illustrated as passing through a limiter 50 which is to be understood as including suitable amplification, limiting and other wave shaping as may be desired. Ordinarily a number of stages of limiting would be employed. The output of limiter 50 is passed through a differentiator 51 to produce the spikes diagrammatically illustrated at line 1. Line 2 illustrates a keying signal there represented at two D.C. voltage levels which are alternatively selectable according to the positioning of any key which orders a phase shift. Line 3 illustrates one fortuitous result of applying the signal of line 2 to the wave at line 1. Line 5 illustrates a second keying signal indentical with that of line 2, but differently related in time to the carrier wave as represented by the timing of the differentiator output at line 4 of FIG. 1. It is to be understood that lines 4 and 1 are alike except in timing and that line 5 might have been shown shifted in time with respect to line 2, as would actually occur in a transmission, but an equivalent shifting of line 4 relative to line 1 is shown to preserve time relationships of lines 2 and 5 to lines 7–13.

It will be noted that the information pulse or bit illustrated in lines 2 and 5 has a length approximating five and one-third cycles. It will also be noted that this pulse shifts the phase of 5 cycles of the carrier wave as illustrated on line 1 and 6 cycles of line 4. Because line 5 illustrates the pulse as occurring somewhat later in the cycle, the termination of this pulse comes after the occurrence of the sixth axis crossing in line 4. Accordingly, line 6 shows 6 cycles of shifted phase. If a delayed phase keying had occurred earlier with respect to the axis crossing of line 1, it is evident that the first axis crossing of delayed phase would have been repeated so that a positive and negative axis crossing would be picked up at the beginning end of the transmitted bit of information. Filtering may largely eliminate extra axis crossings so derived, but cannot prevent the changes in duration of a pulse due to fortuitous inclusion or exclusion of the fractional cycle of uncertainty.

Line 7 illustrates differentiated axis crossing spikes of positive sign corresponding to a tripled frequency with respect to that at line 1 which is the result of multiplying the received frequency by 3. Lines 8, 9 and 10 illustrate outputs of a ring counter adjusted to the triple frequency each being a series of square waves of one-third cycle duration and occurring coincident with spikes in line 7 by which the ring is stepped along in three steps to complete each cycle. Line 11 shows the result of coincidence between a spike pulse in line 3 and output in line 8. Line 12 shows the result of coincidence between a spike pulse of line 3 and an output at line 9. In the event line 10 has a square wave pulse coincident with one of the spike pulses of line 3 this indicates a lack of synchronism between transmitter and receiver since that coincidence represents the forbidden phase, arbitrarily selected in any system since any phase may be forbidden, and the result is a shifting of the ring counter sufficiently to eliminate any coincidence between pulses of line 3 and line 10.

It is accordingly seen that spikes of line 11 correspond to axis crossings in the unshifted phase of the carrier wave of line 1 or the mark pulse of line 3, and that line 12 illustrates the shifted phase axis crossings corresponding to the portion of line 3 occurring during the space pulse shown on line 2. Line 13 then illustrates the result of reconstructing by appropriate logic the signal shown on line 2, somewhat delayed in time, being about 1 cycle delayed at the beginning relative to the pulse employed in the transmitter as at line 2.

Lines 14 through 20 illustrate the same sequence of conditions as previously described, but now corresponding to the timing of the pulse of line 5 when applied to a wave timed as in line 4, to produce a phased output as in line 6. In this case it it noted that the leading edge of the output bit of information lags about one-third period of the carrier wave and that the trailing edge of the information bit lags nearly one period. The gate wave forms of lines 15, 16 and 17 correspond to the triple frequency wave gating from spikes of line 14 in the same manner as gate outputs 8, 9 and 10 correspond to triple frequency spikes at 7. Lines 18 and 19 provide resolution of mark and space axis crossings similar to lines 11 and 12. The difference in pulse length between line 13 and line 20 illustrates the possible jitter present in a high speed binary system. Jitter of this kind can be referred to as inherent distortion in the system and is not reducible except by using additional information. In reducing the inherent distortion the present invention doubles the amount of information available for resolving the times of shift of phase from one condition to another.

It has been known that either the positive or negative differentiated spikes from a differentiator such as 51 could be employed for recovery of the phase information keyed onto the carrier wave, but not both, since polarities require separation at each process step. According to the present invention, both the positive and negative spikes are employed in doubling the information rate without otherwise greatly changing the system, and with no change at the transmitter. According to the diagrammatic sketch of FIG. 3, it is seen that the present invention employs additional logic circuitry to make useful both the positive and the negative differential spikes.

This procedure is illustrated by reference to FIG. 2, here modulated by data commencing at the second cycle as in line 5 in which line 1 shows spike pulses as in line 1 of FIG. 1, and includes also the negative spikes clipped in prior apparatus and omitted from FIG. 1. The time scale is somewhat expanded to facilitate the showing in FIG. 2. An output as in line 1 of FIG. 2 may be full waved rectified as by rectifier 52 and the result thereof passed to a frequency tripler 53 which then operates in the same manner as in prior systems except that the useful frequency is now doubled. This procedure requires that ring counter 54 be constructed to have six conducting states, each conducting for one-sixth period of received frequency in place of one-third period as indicated in FIG. 1. Thus line 3 illustrates an average of six positive spikes for each positive spike pulse of line 1 or an average of three for each positive spike pulse of line 2. When a sine wave is transmitted as a phase-shifted signal it will be evident that a phase shift will be delayed or smoothed and may not occur wholly in one positive or negative half of a cycle This is illustrated in line 1 in that an advanced phase occurring between the first and second negative pulses on line 1 may spread to adjacent portions of the wave shown as positive spikes on line 1. In line 3 the first 10 cycles constitute the timing between the first and third positive spikes of line 1 instead of the normal 12 cycles occurring during two cycles of the carrier wave. The next interval consists of 3 cycles between adjacent positive and negative spikes and of three cycles between the negative spike and the following positive spike to provide the total of 6 intervals on line 3 between two positive spikes of line 1. The following interval between two positive spikes represents four periods of line 3. The timing then returns to the normal undeviated phase with the average of 6 spikes per cycle of received wave, three in each sub-interval between positive and negative or negative and positive spikes.

Lines 4, 5, 6, 7, 8 and 9 represent adjacent fractional intervals of each cycle of a reference wave at the carrier frequency before modulation shown as substantially contiguous nonoverlapping positive voltage excursions or gates, each one-sixth of a cycle of the carrier wave, most conveniently produced as outputs of a six count ring gate or counter. These outputs would be taken at lines 55, 56, 57, 58, 59 and 60 of FIG. 3 as outputs from the ring counter 54. Three allocated phase positions are thus represented in six outputs of one-sixth cycle each.

In order to reconstitute the information transmitted, it is necessary to perform an adding and correlation function. The positive spikes of line 1 are taken as at line 16, and, after inversion of negative spikes, these are at line 17. The first and second outputs from counter 54 may be taken by way of lines 55 and 56 as inputs to OR gate 61 having an output whenever either input occurs. Likewise, the third and fourth gates of counter 54 have outputs taken at lines 57 and 58 to OR gate 62 to provide a single output whenever either gate is actuated. Lines 59 and 60 similarly take the outputs from the fifth and sixth gates of the counter 54 and as inputs for OR gate 63. Each cycle of received wave is thus represented in each of lines 10, 11 and 12, as a ⅓ cycle square wave unmodulated by phase shift and of contiguous timing for coincidence detection as in the referenced patent. It will be noted that lines 10, 11 and 12 of FIG. 2 thus correspond to lines 8, 9 and 10 or lines 15, 16 and 17 of FIG. 1 and have positive portions coincident with spikes of line 16 inasmuch as line 10 of FIG. 2 is formed by combining the outputs of lines 4 and 5, line 11 by combining the output on lines 6 and 7, and line 12 by combining the output on lines 8 and 9. Combining lines 7 and 8 produces the wave form of line 13, while combining lines 4 and 9 produces the wave form on line 14 and combining lines 5 and 6 produces the output on line 15. In line 16 of FIG. 2, it will be noted that each of the positive spikes corresponds to a positive spike of line 1 and will be coincident with a positive portion in one of lines 10, 11 or 12. Likewise, each of the positive spikes in line 17 corresponds to a negative spike in line 1 and will be coincident with one of the positive portions of lines 13, 14 or 15. This coincidence is determined in logic circuitry AND gates as illustrated in FIG. 3. Lines 18 and 19 show dotted line spikes when the idealized phase shift time occurs at the beginning or ending of a positive portion of one of the three reference phase wave forms 10, 11, 12 or 13, 14, 15, but in a practical system the phase does not shift so abruptly and this apparent uncertainty produces a splitting of the shift into two or more parts.

It is now to be understood in summary that the output of differentiator 51 may be taken simultaneously to a positive pulse clipper 64 and to a negative pulse clipper 65, as well as to the full wave rectifier 52. Output from the positive pulse clipper 64 provides input for each of AND gates 66, 67 and 68 whereof the second inputs are, respectively, from lines 55–56, 57–58, and 59–60. Gates 66, 67 and 68 correspond to similar gates disclosed in the patent referred to previously illustrated by wave diagrams of FIG. 1. Gate 67 is assumed to be that gate which corresponds to the forbidden phase output shown at 69, and is employed for the purpose of stepping the ring counter 54 according to well-known techniques, it being understood that two steps of the counter 54 would be required to clear a forbidden output pulse from pulse forming circuitry connected at 69.

Figure 2:
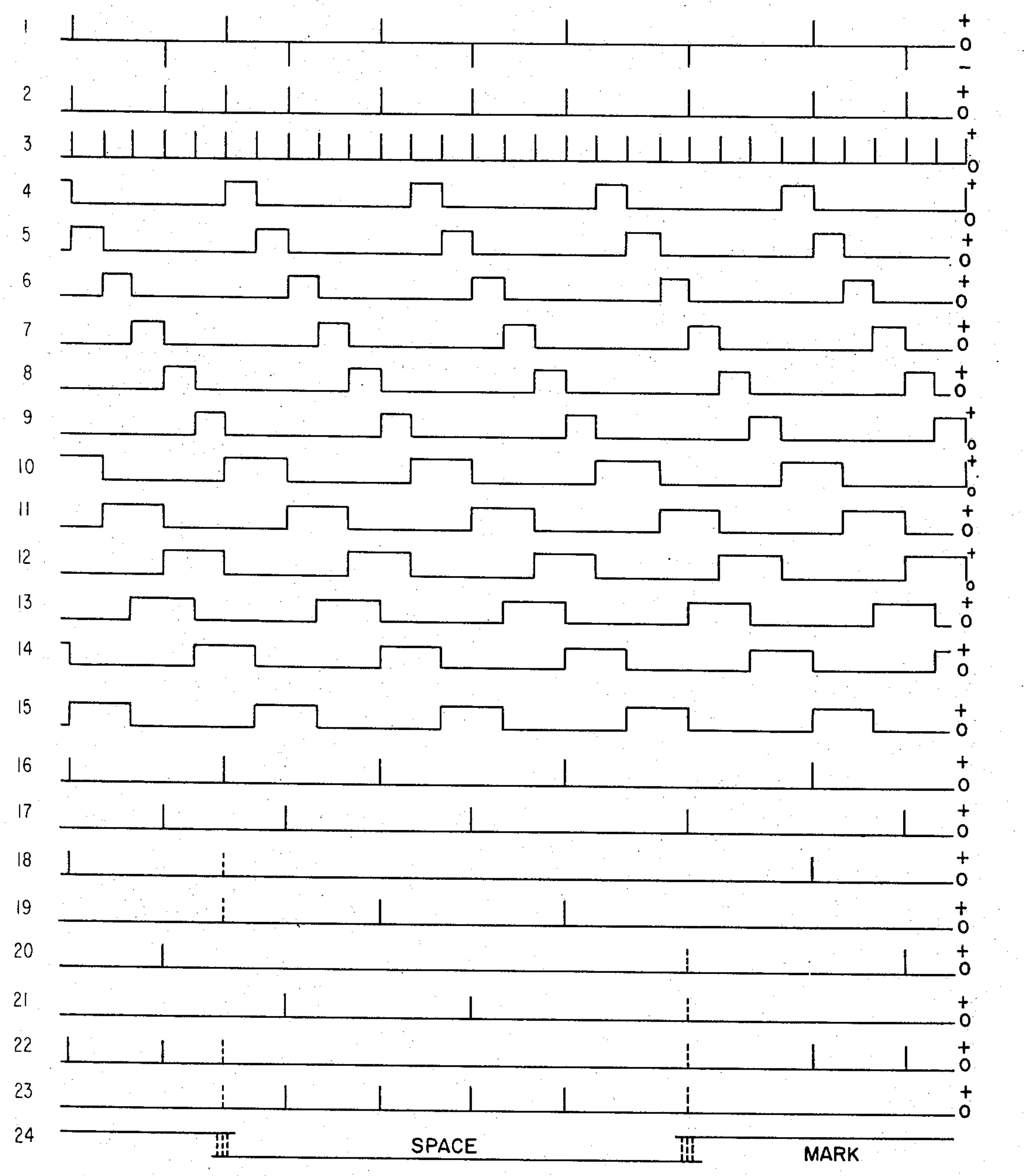
FIG. 2 illustrates similar wave forms on a somewhat different time scale for a system according to this invention to double the amount of recovered information.

The negative spikes of line 1 of FIG. 2 are taken by way of clipper 65 to form the second input for AND gates 72 and 73, the remaining inputs thereto being, respectively, from OR gates 70 and 71, which combine second and third ring gate outputs in one case and fourth and fifth ring gate outputs in the other case. As illustrated in FIG. 3, gate 66 may produce an output corresponding to one phase of transmitted carrier wave and gate 68 a second phase which may be transmitted. The phase represented by gate 67 cannot occur except by lost synchronism which is rejected or employed to correct synchronism. Gates 66 and 68 are actuated only in response to positive axis crossings of the modulated carrier, while gates 72 and 73 can respond only to negative axis crossings. However, OR gate 74 combines the outputs of AND gates 73 and 66 to produce a mark pulse whenever either gate 66 or gate 73 is actuated. Likewise, an OR gate 75 acts to produce a space pulse whenever AND gate 68 is actuated by a positive axis crossing or AND gate 72 is actuated in response to a negative axis crossing.

These results are shown on lines 18 through 24. Line 16 illustrates output from clipper 64 as first input for AND gates 66–68 while line 17 illustrates output of dipper 65 as first input to gates 72 and 73. Line 18 shows the result of separating mark and space signals where the pulses in the line 18 are the mark signals resulting from output of the clipper 64, coinciding with the mark phase condition, e.g., ring gate outputs 1 and 2, while line 19 shows space pulses resulting from the information passed by clipper 64 coinciding with a space phase condition, e.g., ring gate outputs 5 and 6. Lines 20 and 21 represent similarly the mark and space information derived from negative axis crossings passed by clipper 65 to line 17, in which the mark information occurs on line 20 and the space information on line 21, indicating similar coincidence conditions as determined from the negative-going axis crossing spikes of the carrier wave.

Gates 74 and 75 combine these results to produce at line 22 the mark information resulting from both lines 18 and 20 and in line 23 the space information resulting from both lines 19 and 21. Line 24 represents an integrated output pulse of D.C. voltage corresponding to the cumulation of mark or space pulse information derived from lines 22 and 23. It may be observed that jitter is not wholly eliminated, as it cannot be in any high speed digital modulation system, but is reduced to approximately one-half by virtue of doubling the amount of information which is applied by the logic circuitry to produce the integrated D.C. output signal. The process is essentially that of doubling the sampling rate, effected herein by doubling the effective frequency of the carrier wave, thereby to produce a positive axis crossing spike or indicia for each half cycle of the received wave, and cutting in half the time interval during which no new phase information is taken to the resolver-integrator circuit.

Previous description explains only a system in which the information is in the form of selected phases of transmission bearing definite relation to the generated fixed frequency wave, being at 0°, 120° or 240° phase positions, one of these usually being excluded to aid in resolving ambiguity. Other systems benefit from the same technique of doubling the effective frequency of sampling the received wave for axis crossing information. A similar logic scheme is used for a phase-shift system of 72° and M multiples thereof, and for other systems where the phase shift may be expressed as an integer M times $360°/N$ where N is a larger integer. The forbidden phase resolution of ambiguity restricts N to an integer larger than 2 and the phase positions actually used to $N-1$, but it will be appreciated that the present invention is not so restricted, and M may be any integer, preferably less than the integer N, where the multiple and divide method may be employed to derive a reference wave at the receiver from the received modulated wave and to double the ring gate count per cycle of reference wave, each gating interval being ordered by an axis crossing signal of the reference wave of either sign after suitable inversion of alternate axis crossing signals.

While the invention has been described with reference to an exemplary embodiment, it will be understood that other equivalent modes of operation are intended to be included within the spirit and scope of the appended claims.

What is claimed is:

1. In a receiver for a communication wave of fixed frequency phase modulated in increments each a proper fraction of a cycle whereof the denominator is an integer N,
- receiver means tuned to said frequency,
- means developing positive and negative axis crossing signals at said frequency modified by said modulation,
- full wave rectifying means developing a series of signals of single sign at double said frequency as modulated,
- means developing a wave at said frequency times 2N,
- ring gate means of 2N steps actuated by last said means to produce in sequence 2N outputs,
- means taking said 2N outputs by pairs of successively occurring outputs, each pair forming one of a first N output signals,
- means taking differently paired outputs from said 2N outputs each said output combining one signal from each of said two said pairs to produce a second group of output signals delayed from said first N output signals,
- means combining said positive signals with said first output signals and said negative signals with said second output signals to produce two sets of demodulated axis crossing signals, and
- means adding said sets of axis crossing signals to provide modulation information at the frequency of axis crossings of said communication wave.

2. In a phase shifted carrier communications receiver operating to develop mark and space information output from axis crossing time variations by producing a multiple of the axis crossing frequency of the carrier and an unmodulated wave at the average frequency thereof,
- means receiving said carrier,
- means comparing times of axis crossings of said carrier of one sense with predetermined phase portions of said unmodulated wave to produce first output signals indicative of said phase portions coincident with said axis crossings,
- means comparing times of axis crossings of said carrier of opposite sense with other predetermined phase portions of unmodulated wave occurring later by about one-half cycle of said carrier to provide second output signals interspersed between said first output signals, and
- logic means adding said first and second output signals to produce time variation information at the frequency of said axis crossings.

3. In a receiver according to claim 2, said logic means including means doubling the frequency of mark indications and space indications incorporating axis crossing signals of both senses for combining as mark and space signals in a single train of information corrected at each half-cycle of received wave.

4. In a receiver for a system of communication by phase shifting a fixed frequency wave from one to another of N phase positions separated by integral multiples of $2\pi/N$ radians, where N is an integer greater than 2, the combination comprising
- means producing an axis crossing signal at each half-cycle of received wave being alternately positive and negative,
- means developing 2N gating signals during each successive period corresponding to a cycle of unmodulated wave of said frequency,
- means combining said gating signals in adjacent pairs to produce N trains of signals each of $1/N$ cycle duration said signals being contiguous in time of occurrence,
- means producing at least $N-1$ additional trains of signals delayed ½N period from signals of said N trains,
- means combining said positive axis crossing signals with at least $N-1$ of said first said N trains of signals to develop mark and space pulses therefrom,
- means combining said negative axis crossing signals with at least $N-1$ of said N trains of delayed signals to develop additional mark and space signals, and
- means combining both said combined signals to produce mark and space signals from positive and negative axis crossing time variations of a phase modulated wave when received.

5. In a receiver according to claim 4, said combining means to produce mark and space signals from positive and negative axis crossing signals, respectively, including two AND gates combining said positive signals and two AND gates combining said negative signals, with coincident signals in said two N trains of signals.

6. In a receiver according to claim 4, last said combining means including a pair of OR gates one being connected for response to a mark output from either said positive or said negative axis crossings and the other being connected for response to a space output from either said positive or said negative axis crossings.

7. In a receiver according to claim 4, said means developing 2N gating signals being a ring counter stepped in 2N steps for each unmodulated cyclic period of a received wave of said frequency.

8. In a receiver according to claim 4, N being an odd number greater than 1, and the 2N gating signal producing means including means full wave rectifying axis crossing signals derived from said received wave and a ring counter of 2N steps energized at a harmonic of the rectified signal.

9. A phase modulation detector for a fixed frequency wave modulated in $N-1$ of N phases separated by $2\pi/N$ where N is an integer larger than 2, comprising
- a receiver for said wave,
- means developing an axis crossing signal spike at each axis crossing of the received wave,
- means separating said spikes of one sign from said spikes of the other sign,
- means developing 2N gating signals for each cycle of said fixed frequency wave, ring counter means coupled to produce a different output signal during each of said gating signals, means combining said output signals in $2(N-1)$ sequences of which $N-1$ sequences are delayed $\pi$ radians to provide coincidence gating signals for positive and negative signal spikes, means indicating $N-1$ conditions of phase difference between instantly effective coincidence gating signals and said spikes of one sign and $N-1$ conditions of phase difference between instantly effective coincidence gating signals and said spikes of the other sign, and means combining said $2(N-1)$ indications to form $N-1$ conditions corrected 2N times each cycle of said wave.

10. A method of recovering binary data phase modulated on a carrier wave in N steps of phase per cycle, comprising the steps of receiving said modulated wave, developing a train of axis crossing signals including one for each half-cycle of received wave, developing a wave 2N times the carrier frequency, developing from last said wave N output wave trains of voltage excursions within each normal cycle of carrier wave, developing N additional output wave trains whereof the voltage excursions are delayed ½N carrier period from those of first said N wave trains, respectively, differentiating said axis crossing signals to produce two voltage excursions for each said cycle, combining said differentiated signals with voltage excursions of the first and second wave trains to develop cursions of the first and second said wave trains to develop a different indication of phase coincidence between one excursion of each of said N trains to provide received phase indications twice each cycle of received wave.

11. A method of recovering modulation information from a wave of fixed frequency $f$ wherein the modulations are phase shifts in fractions of a cycle equal to $2\pi/N$, N being an integer greater than 2 and wherein a receiver operates to develop axis crossing signals for phase comparison with a multiple frequency signal at least N times said fixed frequency, comprising full wave rectifying said axis crossing signals to produce a double frequency trigger signal, multiplying said trigger signal by N to produce a second trigger signal of $2Nf$ repetition rate, producing 2N discrete output signals of one sign from said second trigger which are contiguous and nonoverlapping in time of occurrence, combining positive going ones of said axis crossing signals with adjacently paired said output signals to develop first modulation detection signals, combining negative going ones of said axis crossing signals with adjacently paired said output signals selected for $\pi$ radians displacement from first said paired signals to develop second modulation detection signals intermediate in time to said first detection signals, and developing composite detection signals from said first and second detection signals to provide phase information at double the frequency $f$.

12. A method of recovering phase modulation information from a received wave of frequency $f$, said information being in phase shift increments of $2\pi/N$ where N is an integer not less than 2 including steps of developing positive and negative axis crossing signals from said wave including said modulation, producing a single series of voltage spikes of one sign from said axis crossing signals recurring at an average repetition rate of $2f$, producing gating signals from said spikes at an average rate of $2Nf$ per second, combining said gating signals to produce a train of $Nf$ pulses each of $1/N$ cycle duration and substantially nonoverlapping in time, combining said gating signals to produce a second train of $Nf$ pulses each of $1/N$ cycle duration and each overlapping in time two adjacent pulses of first said train, comparing timing of said axis crossing signals of one sign with one said train of pulses to detect successive phase shift increments, comparing timing of said axis crossing signals the other sign with the other said train of pulses to detect independently the successive phase shift increments, and combining said phase shift increments detected from axis crossing signals of both signs to produce an average of 2N output indications per cycle of frequency $f$.

13. In a communication system employing a single carrier frequency selectively phase keyed in predetermined multiples of a cycle fraction equal to the reciprocal of an odd integer larger than said predetermined multiples thereby to produce used phase allocations and a specified unused phase allocation; a phase modulation receiver developing an output individual to each of said phase allocations, said receiver comprising means for determining for each of said phase allocations a condition of coincidence between the phase instantly received and a predetermined phase of an unmodulated wave operating synchronously with one of the allocated phases of received wave; and means responsive twice during each cycle of received waves for determining coincidence between the phase of received wave and the phase of said unmodulated wave.

14. In a communication receiver according to claim 13, said receiver including a reference wave generating means operative at a frequency said integer times said carrier frequency and phase comparison means comprising coincidence gating means responsive to the instantly received phase and that cycle of said reference wave synchronous therewith.

15. A receiver for an angle modulated steady communication wave comprising means developing timing pulses coincident with axis crossing times of said wave, means developing a set of pulses of fixed time separation at a frequency 2N times the frequency of said wave where N represents a repeatable degree of angle modulation characteristic of said wave, said pulses being derived from successive positive and negative axis crossings of the wave, means combining pairs of pulses derived from adjacent positive and negative axis crossings into a first set of pulses of repetition rate not exceeding N times the frequency of said wave, each corresponding to a degree of modulation of the instantly received wave, means combining pairs of pulses derived from adjacent positive and negative axis crossings into a second set overlapping said first set, means selecting pulses of said sets according to said degree of modulation to provide separate pulses at a rate N times the frequency of said wave for each set, thereby to separately indicate, in overlapping sequences, the degree of modulation indicated, means for combining pulses from said sets into a composite set having not more than N variations representative of modulation.

References Cited

UNITED STATES PATENTS 3,078,344 2/1963 Crafts et al. ---------- 178—88

JOHN W. CALDWELL, *Acting Primary Examiner.*

DAVID G. REDINBAUGH, *Examiner.*

J. T. STRATMAN, *Assistant Examiner.*